Feb. 7, 1967 R. E. WILLIAMS ETAL 3,303,273

COLOR TELEVISION DISPLAY DEVICE

Filed May 23, 1963 5 Sheets-Sheet 1

INVENTORS
RICHARD E. WILLIAMS
BY & JOSEPH A. HOHOS

Hurvitz & Rose

Feb. 7, 1967 R. E. WILLIAMS ETAL 3,303,273

COLOR TELEVISION DISPLAY DEVICE

Filed May 23, 1963

5 Sheets-Sheet 2

INVENTORS
RICHARD E. WILLIAMS
BY & JOSEPH A. HOHOS
Hurvitz & Rose

Feb. 7, 1967 R. E. WILLIAMS ETAL 3,303,273

COLOR TELEVISION DISPLAY DEVICE

Filed May 23, 1963 5 Sheets-Sheet 3

INVENTORS
RICHARD E. WILLIAMS
BY & JOSEPH A. HOHOS

Hurwitz & Rose

INVENTORS
RICHARD E. WILLIAMS
BY & JOSEPH A. HOHOS
Hurvitz & Rose

Feb. 7, 1967 R. E. WILLIAMS ETAL 3,303,273

COLOR TELEVISION DISPLAY DEVICE

Filed May 23, 1963 5 Sheets-Sheet 5

INVENTORS
RICHARD E. WILLIAMS
BY & JOSEPH A. HOHOS
Hurvitz & Rose 3,303,273
COLOR TELEVISION DISPLAY DEVICE
Richard E. Williams, Fairfax, and Joseph A. Hohos, Falls Church, Va., assignors to Scope Incorporated, Falls Church, Va., a corporation of New Hampshire
Filed May 23, 1963, Ser. No. 282,745
20 Claims. (Cl. 178—5.4)

This invention relates generally to color television display devices of the field sequential type and more particularly to electro-mechanical colour television systems which generates colour television displays from black and white television displays.

In field sequential color television display devices, the primary colors are assigned to successive fields in the scanning pattern and the color sequence is introduced as successive fields are scanned. Although present television standards call for dot sequential color transmission, the conversion of present signals to field-sequential form is readily accomplished via several methods familiar to those skilled in the art.

Electro-mechanical display devices exploiting the field-sequential mode have not become popular primarily because of their inability to compete economically with the now well-known shadow mask cathode-ray-tube and associated circuity. Other factors tending to inhibit their acceptance have been related to: size, as in the case of a mechanically rotating color wheel; electro-mechanical complexity, as in the case of multiple solenoid actuators or multiple color-selecting elements; noise, normally resulting from the forces necessary to rapidly change momenta of moving members; instability, usually related to frictional and dimensional variations; and limited life due to mechanical wear. Optical interference effects such as color "crawl," "moire," and flicker have also been cited as deterimental.

The present invention has for its primary objective the overcoming of the cited objections. In a system exemplifying the present invention, six miniature tubes consuming an input power of less than twenty-five watts convert the display produced a conventional 21-inch monochrome receiver to a color display by driving a color mask with three watts of power, and by additionally converting received conventional color signals to an appropriate field-sequential form.

In the present invention a color mask, parts of which vibrate, is placed over the face of a conventional monochrome (black and white) cathode-ray-tube displaying the television image. Color information is supplied on a field-sequential basis. Color switching is accomplished by horizontal motion induced between a translucent plate havng color striae and a stria-selecting aperture plate juxtaposed therewith. A mask driver, excited by a signal divided down from and appropriately delayed from vertical synchronization pulses so as to expose color striae in synchronization with corresponding color-selective fields, is able to drive the mask with very low energy, negligible noise, and with a mechanism merely slightly larger than the viewing screen surface area. One set of striae is oriented substantially orthogonal to the television raster lines so as to eliminate optical interference effects, and the other is canted relative to the first so as to produce vertically-changing color stimuli in response to horizontal motion.

The use of scanning apertures to select color striae is not new, but the invention is found to reside in the manner in which the selection process is simply and stably implemented.

Accordingly, a principal object of the present invention resides in controlling the vibration of a mask so as to maintain accuracy of synchronization and color excursion despite variations in supply voltages, frictional forces, etc.

Another object of this invention is to provide a color mask which can controllably interpose color-selective transmission filters between the viewer and a black and white cathode-ray-tube, or interpose a neutral filter therebetween to yield black and white displays.

Another object of this invention is to provide means of employing vertical striae of color in a manner that produces a broad colored field moving in the vertical direction from top to bottom in substantial synchronization with the vertical scanning components of a television roster display.

Still another object of this invention is to provide a color mask offering advantages of simplicity and freedom from stress and friction.

This invention will now be described with reference to the accompanying drawings, of which:

Figure 7:
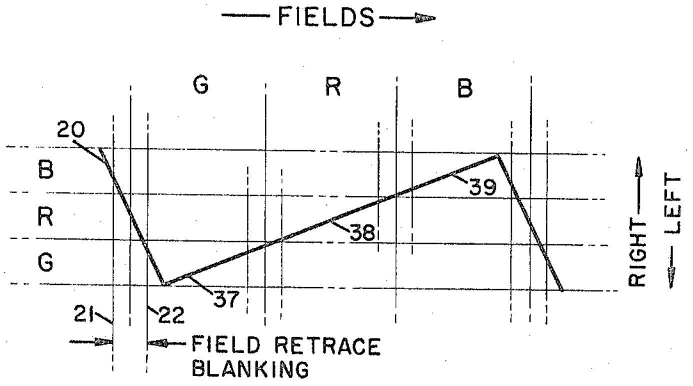
Figure 8:
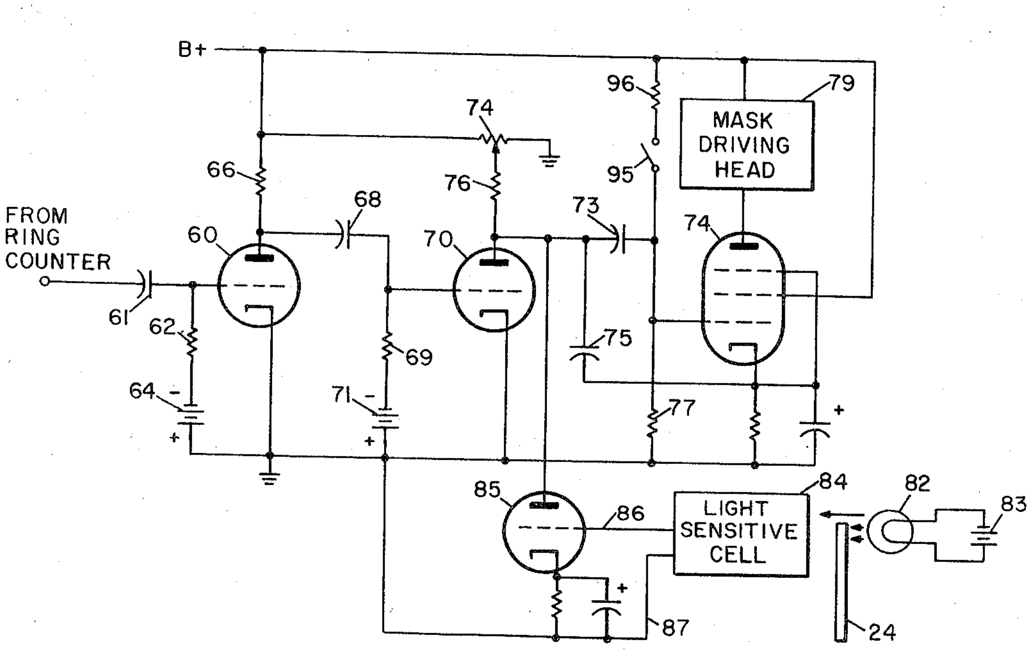
Figure 9:
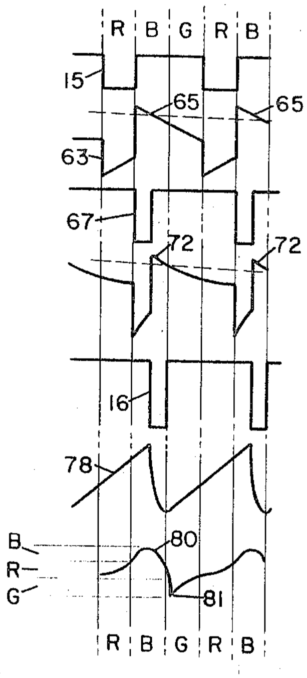
Figure 10:
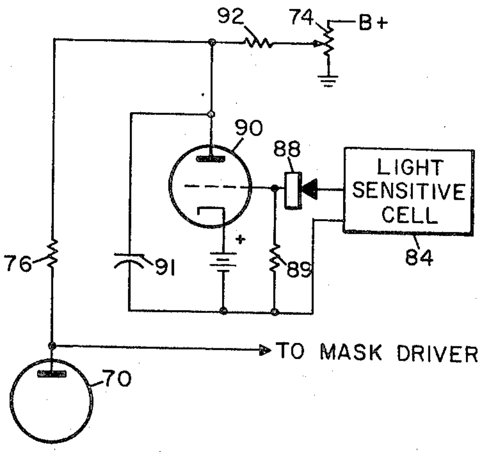

FIGURE 7 provides an expanded view of an ideal motion waveform;

FIGURE 8 is a schematic circuit diagram of a delay, mask modulator, and feedback system;

FIGURE 9 is a plot of voltage waveforms associated with the circuit of FIGURE 8; and FIGURE 10 is a circuit diagram of a gain-stablization circuit, employed in the invention.

Throughout the drawings, like reference characters refer to like elements in the various figures.

In a standard television receiver using interlaced scanning with a horizontal line frequency of 15,750 cycles per second, the field rate is 60 c.p.s. and the frame rate is 30 c.p.s. The field interval is thus approximately 16 milliseconds, of which approximately 10% corresponds to the vertical blanking interval. Thus, the vertical blanking interval is in the order of two milliseconds in length.

Figure 1:
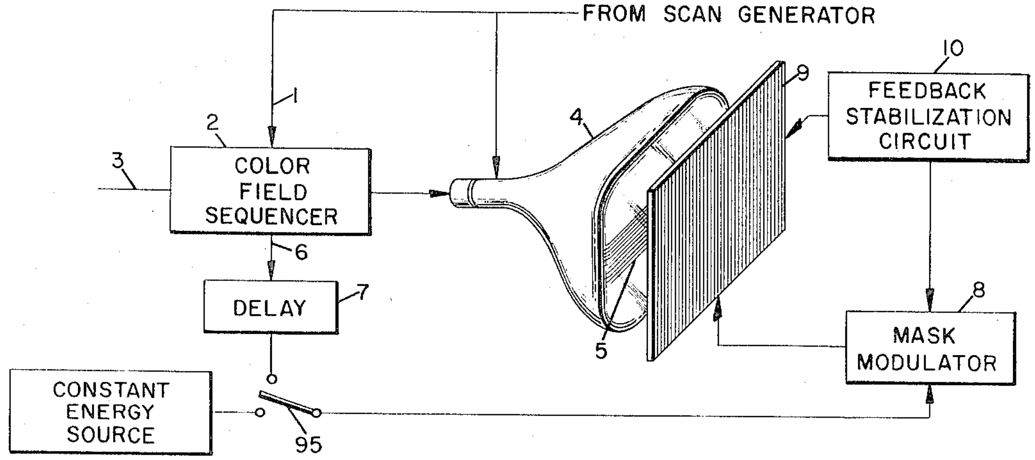
FIGURE 1 is a block diagram of the major elements of the invention.

Referring to FIGURE 1, vertical synchronization pulses stemming from a vertical scan generator are applied via lead 1 to the color field sequencer 2, which has the property of processing the composite video signal arriving via lead 3 into a sequence of fields with selected color information for application to a cathode-ray-tube 4. The action of the color field sequencer 2 is such as to cause the monochrome raster 5 on the face of the cathode-ray-tube (CRT) 4 to contain primary color information respectively assigned to successive fields. Thus, the CRT 4 may have a black-and-white raster 5 containing green information, followed by a black-and-white field containing red information, then by a black-and-white field containing blue information, then green, and so on. When the face of the CRT 4 is observed by a human eye, the addition of color information in the aforementioned fashion serves to only slightly alter the nature of the black-and-white presentation, since the persistence of the human eye acts to sum the contributions from the various primary color signals to yield an additive white signal, which is the function of the monochrome presentation in any event. If the human eye were rapid enough to observe each individual field without persistence effect, the successive fields would be seen to differ substantially, however, since the particular primary color excitation will vary with successive fields.

The color field sequencer 2 normally has as an integral component a ring counter with a number of stages corresponding to the number of primaries desired; e.g., three stages if the primaries red, green, and blue are to be used. One of the stages of the included ring counter will provide an output pulse always synchronized with the beginning of a particular color field, red for example. Such a pulse is applied via lead 6 to a delay circuit 7. The delay circuit 7 serves to anticipate the next change in field, and thus of color, so as to enable the mask modulator 8 to change the color of the mask 9 at the proper instant despite mechanical delays in the system. In essence, the mask 9 must, for example, be commencing a shift to green prior to the receipt of a green synchronization pulse from the color sequencer 2. The delay 7 creates an artificial pulse preceding the actual synchronization pulse so as to accommodate the implicit delays in the system and to enable a component of mask motion to straddle a vertical blanking interval, as will be described in detail hereinafter.

Although not essential to the invention, it is desirable to supply a feedback stabilization device 10 to assure that mask motion is highly stable despite changes in supply potentials, frictional loading, etc. The feedback stabilization circuit 10 senses the mask motion and applies appropriate correction to the mask modulator circuit 8.

Figure 2:
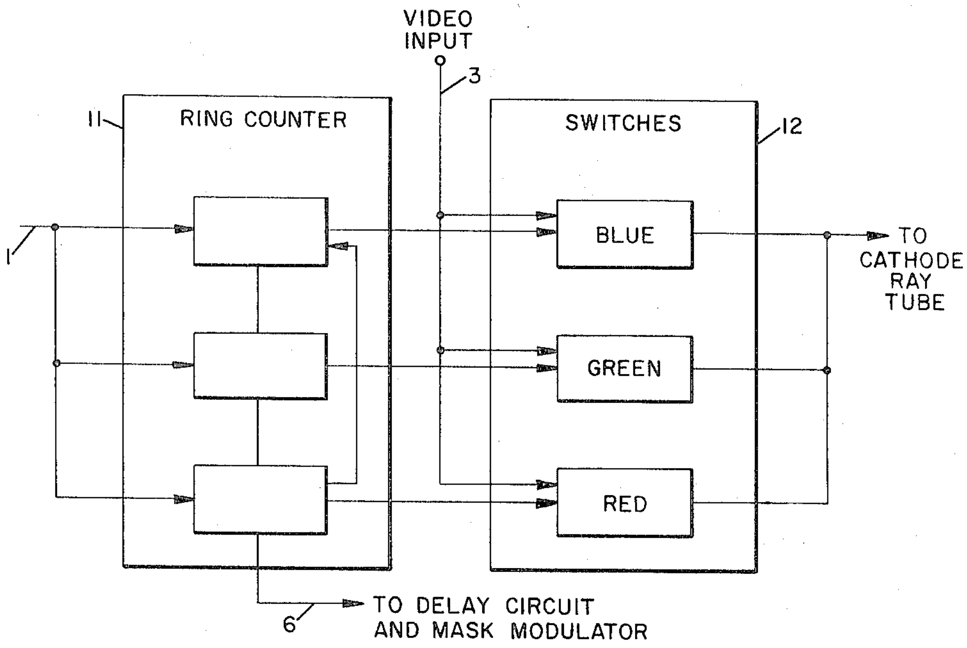
FIGURE 2 is a block diagram of the makeup of a typical color field sequencer.

The color field sequencer 2 of FIGURE 1 normally consists of a ring counter 11 triggered by vertical synchronization pulses, and associated switches 12, as illustrated in FIGURE 2. The ring counter 11 may take the form set forth in detail in R. E. Williams' pending application for United States Letters Patent, Serial No. 199,493, filed June 1, 1962, entitled, "Color Television Receiver." In the case of a tri-color system, three stages are used in the ring counter 11 and make available for switching purposes waveforms such as 13, 14, and 15 of FIGURE 6. The latter waveforms are seen to provide cyclic gating pulses synchronized to successive display fields and respectively associated with the primary colors corresponding to fields B, G, and R. One of the waveforms, 15 in the example, is processed to obtain a delayed synchronization pulse 16 from which a mask-driver sawtooth 17 can be formed. It is seen that the retrace or steep portion of the driver sawtooth occurs slightly prior to a change of fields, as indicated by the waveform 14, for example. When the driver sawtooth 17 is employed to mechanically drive a mask, a somewhat integrated motion waveform 19 results.

A more detailed waveform of the idealized mask motion is illustrated in FIGURE 7. Although it is theoretically possible to obtain almost arbitrarily fast mechanical retrace, the forces associated with rapid retrace quickly become very high, resulting in high power drive circuits, noise, and high mechanical stresses. In order to avoid these conditions, the retrace is allowed to appreciably slope, as indicated by the portion of the waveform 20, but as has been pointed out is timed so as to dwell most of its time in a field retrace blanking interval occurring between bounds 21 and 2. As will later be shown, mask motion during the retrace interval is associated with color impurities, and therefore must take place as quickly as possible and preferably during a cathode-ray-tube blanking interval. The timing sequence of FIGURE 6 coupled with the motion retrace condition of FIGURE 7 places this undesirable motion substantially within the vertical retrace blanking interval, thus mitigating color contamination.

Figure 3:
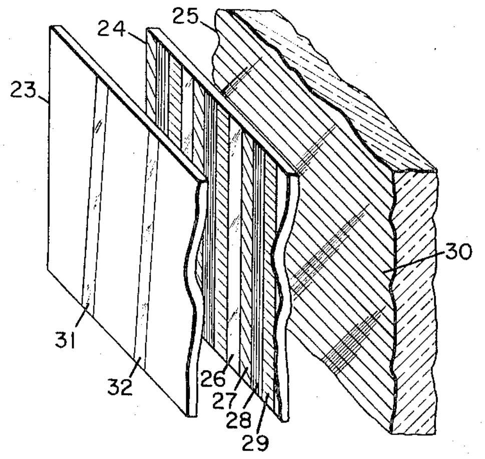
FIGURE 3 is an expanded cut-away view in perspective of juxtaposition of elements of a color mask and a cathode-ray-tube faceplate.

The color mask 9 of FIGURE 1 consists of two major optical components, an aperture plate 23 and a translucent striped color plate 24, FIGURE 3. These optical elements are interposed between the viewer's eyes and the face 25 of the cathode-ray-tube. The color plate 24 has imprinted upon it various color strips 26, 27, 28, 29, that are oriented substantially orthogonal to the raster scanning lines 30 of the CRT face 25. The orthogonality is very important, since severe optical interference patterns are observed when the color striae 26, 27, 28, 29, get to within an angle of approximately 30° to the raster lines 30. This requirement also applies to the transparent apertures 31, 32, in the aperture plate 23 relative to the CRT raster lines.

Figure 4:
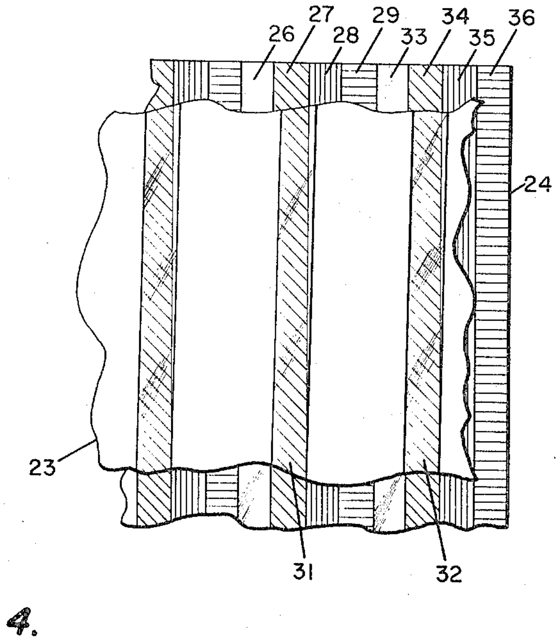
FIGURE 4 is a view in front elevation of mask elements, showing their optical interrelationship.

Although the slopes of the repeating transparent apertures 31, 32 of the aperture plate 23 are exaggerated for clarity in FIGURE 3, the apertures are actually very nearly parallel to the color striae on the color plate 24 as can be seen in FIGURE 4. The distance between transparent apertures 31, 32 is approximately 0.050 inch for a 21-inch (diagonal measurement) CRT, this figure being given solely by way of example. Thus, there are several hundred such apertures across the viewing area. At normal viewing distance, the individual apertures are indistinguishable and the eye sees an entire field having a hue determined by the color seen through the apertures. The color plate 24 is provided with repeating striae 27, 34 of identical color spaced by exactly the dimension between apertures 31, 32. Since this condition is maintained over the entire viewing area, when the aperture plate 23 and the color plate 24 are stationary the viewing area assumes one, or at the most two, hues. The apertures 31 and 32 are slightly canted relative to the color striae as shown so that a specific set of color striae, 27 and 34 for example, dominates more toward the low end of the apertures while another color group, 28 and 35 for example, tends to have more effect at the top. If the aperture plate 23 and color plate 24 are moved relative to one another in a horizontal direction, the over-all effect over the viewing area is for the colors corresponding to the various striae to move from top to bottom of the over-all viewing field, or vice versa, depending upon the relative direction of motion between plates. Thus, a horizontal motion yields a vertically changing color stimulus. It can be seen, for example, in FIGURE 4 that if the aperture plate 23 is moved to the right relative to the color plate 24 the color "spikes" stemming from color striae 28 and 35 will appear to pierce downward, gaining additional width, due to the cant. The over-all effect at normal viewing distance is that of a blanket of color corresponding to the color of striae 28 and 35 moving down the viewing screen.

Since relative motion between the aperture plate 23 and the color plate 24 is all that is needed to change effective hue, either of the two plates can remain stationary while the other moves, or both can move. The aperture plate 23 can, for example, be made photographically using as a base material a stable plastic sheet. The color plate 24 may be made, for example, by silk-screening transparent colored ink onto a glass surface or by color photographic methods. It is desirable to move as little mass as possible, and it is therefore preferable to vibrate the lighter of the two plates, which in the aforementioned case is the plastic aperture plate. For simplicity of exposition, this mode of operation is assumed through the rest of the description, but the invention is not confined to this mode since it is obvious that the motion roles played by the plates can be interchanged.

The waveform of FIGURE 7 shows how the aperture plate position varies with time measured in field intervals. The motion of the plate carries it through three zones corresponding to three typical primary colors, green, red, and blue. During the green field, the aperture plate 23 of FIGURE 4 dwells in a position where the clear apertures 31, 32 substantially expose green striae 27, 34. This corresponds to a portion of the waveform 37 immediately following the retrace 20 in FIGURE 7. As the aperture plate 23 of FIGURE 4 progresses to the right in accordance with the waveform of FIGURE 7, the red striae 28, 35 become exposed creating a red field during the portion 38 of the waveform of FIGURE 7. As the motion progresses, the blue field is effected in the same manner, corresponding to the waveform region 39 of FIGURE 7. Following the blue field, a rapid retrace action repositions the apertures over the green striae and the process is reiterated.

While the mask motion is occurring, the highest intensity portion of the cathode-ray-tube display progresses from the top to bottom of the raster 5 of FIGURE 1 due to the vertical scanning action of the scan generator, which is an implicit part of the television system to which the invention is attached. Although the persistence of the cathod-ray-tube phosphor has a mitigating effect on this top to bottom intensity sweep, the effect is not entirely nullified and thus it is necessary to have the color fields created by the color mask 9 progress generally in synchronization with the vertical sweep from top to bottom for uniform color. If this were not done the color would vary in hue due to "crossover" of the CRT trace with a given field hue; i.e., various parts of the raster would have differing dwells on the primary colors. The requirement is accommodated by using a motion waveform such as that of FIGURE 7 and, in the case where the aperture plate 23 is the element in motion, by tipping the tops of the aperture slots 31, 32 in the direction of the sweep motion.

Although aperture plate motion is used for exposition, similar results; i.e., top to bottom color sweeping motion, can be obtained by moving the color plate 24 provided the tops of the color striae are in this case canted in the direction of sweep motion. The principle also holds for two-color masks or masks containing more than three primary colors. In any event it is important to note that the cant angle is held constant and invokes approximately one-color stria displacement.

Certain details of the color mask design are very important to the success of the invention. Since most of the objections to mechanical devices; e.g., noise, wear, driving power, etc., relate directly to the forces involved, it is essential that the mass of moving members be rendered very low, and that stresses be held to a minimum. The present invention succeeds therein by means of the structure of FIGURE 5. The driver sawtooth waveform 17 of FIGURE 6 is applied to a solenoid 40 having a movable armature 41. When the solenoid 40 is de-energized, the armature 41 is held against an excursion-limiting member 42 which may be made of felt to avoid noise when the mask is in action. The armature 41 is caused to reside in this position by means of a light spring 43 pressing against a flange 44 affixed to the armature 41. The entire solenoid assembly is fastened to the mask main frame 45 by means of a mounting bracket 46 and adjustable screw slots 47, 48. The vertical translational motion of the solenoid armature 41 is converted to horizontal translation by means of a bell crank 49 journaled on a fixed pivot 50. A coupling shaft 51 couples the horizontal translation from the bell crank 49 to the aperture plate 23. A sleeve bearing 53 serves to position one end of the aperture plate 23 in the vertical dimension, and an adjustable pin plate 54 serves to position the other end of the aperture plate 23 by vertically positioning a pin 55 in a slot 56 in the aperture plate 23 as shown. The color plate 24 is affixed to the color mask frame 45 so as to be juxtaposed behind the aperture plate 23. By means of vertical adjustment of the pin plate 54, the aperture plate 23 is pivoted about the fulcrum created by the coupling rod pivot 52, and the proper cant angles between apertures on the aperture plate 23 and the colored striae contained on the color plate 24 are obtained in accordance with the teachings of FIGURE 4. The proper cant angle is normally that in which the top of an aperture such as 31 of FIGURE 4 is horizontally displaced by slightly less than one color stria from the bottom of that aperture. By this means, maximum saturation of a given color is leaving the viewing area at the bottom of the screen at the moment that maximum saturation of the following color is entering the top of the viewing screen.

The proper lateral positioning of the aperture plate 23 over the color plate 24 is initially set by means of the screw slot adjustments 47, 48. This adjustment is made with the solenoid 40 de-energized so that the armature 41 is snug against the excursion-limiting member 42. Vertical adjustment of the retaining bracket 46 produces lateral adjustment of the aperture plate 23. This adjustment is normally made to produce the color following the motion retrace, or the color green with reference to FIGURE 7. Regardless of the primary colors used or the sequence thereof, the adjustment is made to produce the proper color at the excursion limit to provide a reference for all other motions.

The vibrating aperture plate 23, which must be made of thin, flexible material such as thin stable plastic, is allowed to freely slide between the rigid color plate 24 and a rigid transparent cover plate 57 (shown cut-away) spaced from the main frame 45 by washers under the mounting screws 98, or similar means. The spacing between the cover plate 57 and the color plate 24 is enough for free sliding motion of the aperture plate 23, yet not so great so as to cause parallax problems when the viewer is looking through the apertures at the color striae. With proper spacing, permissible viewer locations can subtend angles as large as 150° without noticeable color contamination due to parallax effects.

Several features important to the present invention are imbedded in the recited structure. Since several hundred apertures must match corresponding color striae across the entire field of view, dimensional stability demands become typically one part in five thousand or better. In order to maintain such registration, it is not only essential that materials exhibiting low coefficients of expansion and moisture absorption be employed but also that stresses not be placed upon the members so that "cold flow" or other dimensional changes take place. The recited structure places no residual stress upon the thin moving member 23 other than that imposed by its own very low mass. There are, for example, no springs at the left hand end of the member to hold it straight. Such springs lead to intolerable distortion and mis-registration.

Since spring tension cannot be employed to keep the moving member 23 planar, the objective of registration of striae without parallax, etc., is difficult to attain. Requirements for low mass require that the thickness of the moving member 23 be very low, less than 0.010 inch for example. Transparent rigid material of sufficient strength is not economically feasible and thus captivation must be effected. Said captivation must be precise so that the moving member 23 is held in close juxtaposition to stationary member 24. Simultaneously, the device must be relatively friction-free. These objectives can be met only by the use of a pair of rigid plates in accordancce with the teachings of FIGURE 5. In the figure, one of the rigid plates, 57, is transparent and the other, 24, is the color plate. The essential feature of the invention is that the moving member of the mask assembly must be flexible and captivated between two rigid members.

The solenoid 40 pulls the armature 41 against the spring 43 during energization. Although the retrace portion 20 of FIGURE 7 should in general be as rapid as possible, the sloped portion 37, 38, 39, should preferably be maximally controlled in a manner commensurate with production practices. To attain this objective, the solenoid 40 is energized during the slope 37, 38, 39, and the spring 43 is allowed to provide the retrace 20. The solenoid 40 is deactivated for the retrace interval.

The manner in which this is done can be seeen with reference to FIGURES 8 and 9. The waveform 15 of FIGURE 9 is derived from the color field sequencer 2 (of FIGURE 1) and is applied to the grid of a tube 60 by means of a coupling capacitor 61 and a grid return resistor 62. The RC combination provided by the capacitor 61 and the resistor 62 slightly differentiates the waveform 15 to produce the waveform 63 at the tube grid. The grid of the tube 60 is maintained below cut-off by a suitable bias source 64 so that the tube 60 conducts only during the positive peaks 65 of the waveform 63. A high-value plate load resistor 66 produces a large plate swing on the tube 60 and an output wave shape of negative-going form such as 67 of FIGURE 9. The negative-going pulse is differentiated by the RC combination consisting of the capacitor 68 and the resistor 69 and then applied to the grid of tube 70. The grid of the tube 70 is maintained beyond cut-off potential by means of a bias source 71 enabling the tube 70 to conduct only during the positive differentiated peaks of the waveform shown as 72 in FIGURE 9.

The plate of tube 70 produces a negative-going output pulse 16 whose amplitude can be adjusted by means of potentiometer 74, which in effect adjusts the B+ supply to the tube. By comparing waveform 16 to 15 in FIGURE 9, it is seen that the process of double-differentiation results in an effective delay between the vertical, or field, synchronization pulse 15 and the trigger 16 for the mask driver tube 74. As was pointed out earlier, this delay is necessary to anticipate the arrival of a field synchronization pulse to accommodate mechanical inertias that will be discussed further below. Capacitor 75 quiescently charges to approximately the cut-off plate potential of tube 70. When the tube 70 conducts, the capacitor is rapidly discharged through the low conduction resistance of the tube. At the cessation of the current pulse 16, the capacitor 75 is allowed to recharge through large resistance 76 to a voltage given by the adjustment of the potentiometer 74 setting. The recharging process of capacitor 75 is relatively slow because of the large value of resistance 76. The resulting waveform 78 of FIGURE 9 is sawtooth in form and is of the proper shape to produce the desired mask motion of FIGURE 7.

The sawtooth waveform 78 is applied to the grid of the mask driving tube 74 via capacitor 73. The tube 74 is driven so as to substantially become cut off at the negative peaks of waveform 78 and to conduct quite heavily at the positive peaks. The mask driving head 79, which may in fact be the solenoid 40 of FIGURE 5, thus receives current pulsations similar in shape to the voltage grid excitation waveform 78.

Figure 5:
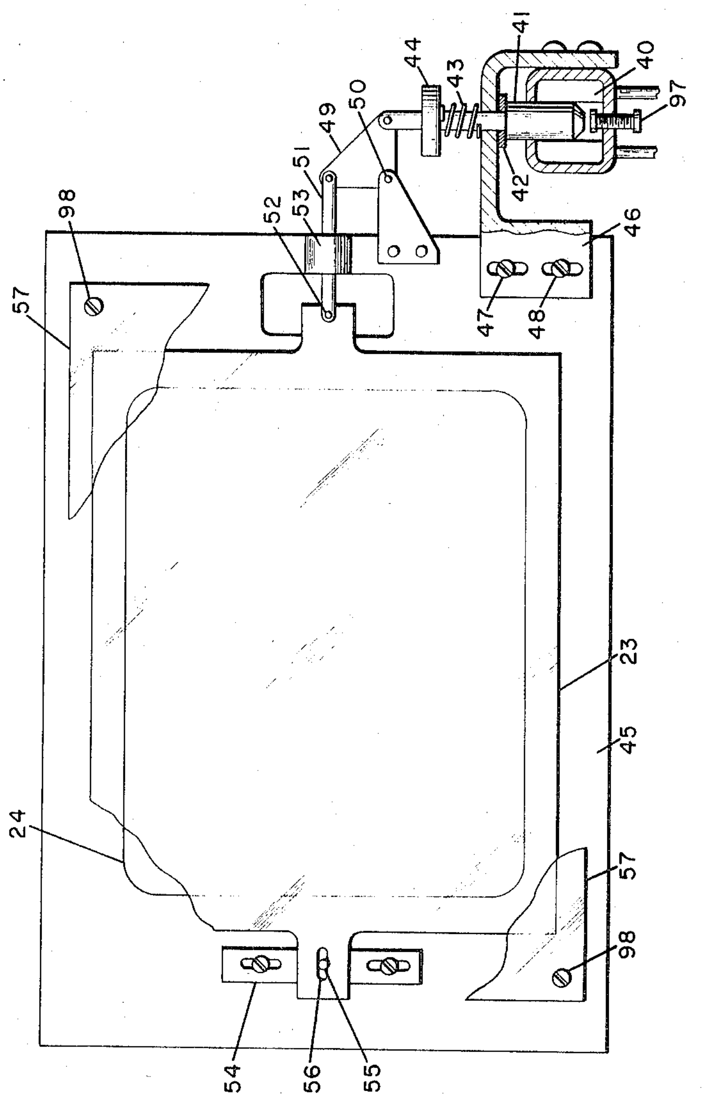
FIGURE 5 is a partially cut-away view in front elevation of an entire mask assembly.
Figure 6:
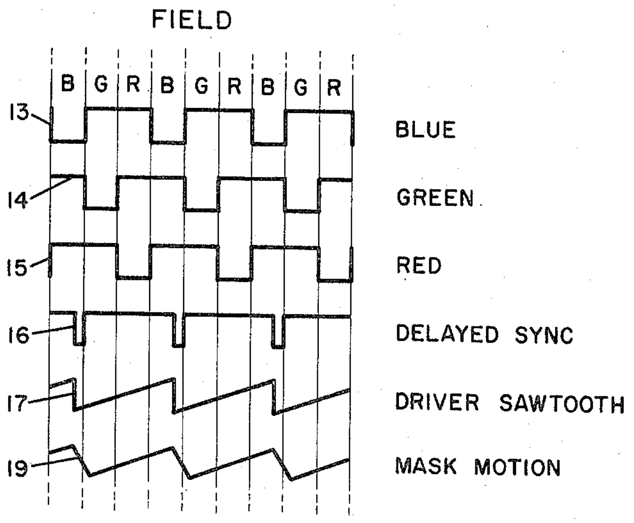
FIGURE 6 illustrates various significant waveforms in the invention.

The driving energy applied to the mask of FIGURE 5 is largely dissipated in losses encountered when overcoming momenta due to the mass of the moving elements. Since momentum is given by the mass times the velocity of a moving body, maximum momentum is observed in the mask assembly during the retrace portion 20 of the motion waveform in FIGURE 7. It is necessary at the conclusion of the retrace to reverse and reduce the momentum and to proceed on the slope 37. By using a partially-dissipative stop such as the felt washer 42 of FIGURE 5, the retrace (left-going in the figure) motion of the aperture mask is abruptly stopped so that the solenoid 40 can commence the sloped portion of the waveform of FIGURE 7 without high impulse demands. The amplitude of the mask-driving signal 78 in FIGURE 9 is adjusted by means of potentiometer 74 in FIGURE 8 so that the solenoid 40 is able to pull against the spring 43 in FIGURE 5 at just the proper velocity to reach the correct distance (one gamut of color striae at the aperture plate 23) before the retrace portion of waveform 78 recurs. The spring 43 then supplies the retrace energy and produces a retrace curve 80 of FIGURE 9. Since the mask driver tube 74 becomes cut off prior to the receipt of a field synchronization pulse as seen in the waveforms of FIGURE 9, the mask has some time to build up its retrace velocity while still substantially dwelling in the proper color region, and the result is a highly effective low energy driving system. The sharp cusp 81 in the last waveform of FIGURE 9 results from the partially elastic collision of the armature 41 with the felt limiting washer 42 at the end of the retrace interval. The last waveform of FIGURE 9 is a practical realization of the ideal waveform of FIGURE 7. Since the standard television field rate is 60 cps, the waveform repetition rate in the three-color field case is 20 cps., or one-third of the field rate. The low energy driving technique described produces a mechanism with a very low noise level and very low power dissipation.

Improvement in wave shape and stability of mask motion is obtained through use of the feedback circuit of FIGURE 8. A light source 82 energized by a source of power 83 is positioned so as to allow the edge of the aperture plate 24 to cast a shadow on a light sensitive cell 84. The light sensitive cell 84 provides an output voltage that follows the action of the aperture plate 24, and may take the form of the last waveform in FIGURE 9. This voltage is applied to the grid of a tube 85 via lead 86. Through proper choice of polarity of the output leads 86, 87 from the light sensitive cell 84, the plate waveform of the tube 85 can be rendered out of phase with the driving waveform seen at the plate of tube 70. In a manner well known to those skilled in the art, the feedback circuit will cause differences between the mask motion and the driving waveform to be largely canceled so as to cause the mask to follow driving waveforms more accurately.

As an alternative to the waveform feedback shown in FIGURE 8, a direct current feedback or automatic gain control may be used as seen in FIGURE 10. The latter circuit yields the advantage of higher amplitude stability at the expense of some waveshape instability. The light-sensitive cell 84 which senses the mask motion as in FIGURE 8 provides an output that is rectified by the diode 88 to produce a positive potential across resistance 89. In the manner well known to the art the positive potential causes increased current in the tube 90 and serves to lower the plate potential on the pulse amplifying tube 70 by dint of the increased potential drop in resistor 92. Capacitor 91 serves to smooth the output of tube 90, allowing high gain without oscillation.

It can be seen that any tendency for the mask excursion to increase will be accompanied by a lowering of the plate potential to tube 70, and it thus reduces the mask-driving waveforms. The over-all effect is that of holding the mask excursion extremely steady despite variations in frictional forces, etc.

Although a photo-electric technique for sensing the mask motion is generally preferable because it does not mechanically load the mask, other mechanical-to-electrical transducers such as electro-magnetic pickups, electro-static pickups, etc., can be employed. The feedback stabilization circuit is indicated as block 10 in FIGURE 1.

The aperture mask 23 of FIGURE 4, and more specifically aperture 31 thereon, scans back and forth over color striae 27, 28, 29, and the retrace is adjusted by potentiometer 74 to commence before excursion into striae 33 or 26. In one embodiment of this invention, the striae 33 and 26 are made clear so that the mask can be rendered substantially devoid of color at will. To accomplish this, it is necessary to position the aperture plate 23 so that the apertures 31, 32 lie over clear striae 26, 33, and the motion of the mask is terminated. This is accomplished by means of switch 95 in FIGURE 8. When normal color is desired, switch 95 is open, unaffecting the operation as previously described. When black-and-white presentation is desired, switch 95 is closed, bringing the grid of the mask driver tube 74 in a positive direction via resistor 96 which is connected to the B+ supply source. When switch 95 is closed, therefore, the mask driver tube 74 goes into heavy conduction and remains in this state until the switch is opened. Heavy conduction in the mask driver tube 74 corresponds to energization of the solenoid 40 in FIGURE 5. The solenoid armature 41 is thus pulled down when switch 95 is closed until it bottoms against adjusting screw 97. The screw 97 is adjusted until the apertures of the aperture plate 23 lie over the clear striae in the color plate 24. The slight canting of the aperture plate 23 does not appreciably impair the clarity because of the much higher light transmission of the clear striae 26, 33 than of the adjacent color striae. It is reiterated that, although for clarity the striae are shown large in the drawing, in practice the apertures are vey closely spaced, and the entire screen appears to turn clear when the motion is stopped as described.

While I have described and illustrated one specific embodiment of my invention, it will be clear that variations of the details of construction which are specifically illustrated and described may be resorted to without departing from the true spirit and scope of the invention as defined in the appended claims.

We claim:

1. Color television display apparatus comprising a cathode-ray tube having a target area, scanning means associated with said tube to scan said target area successively and cyclicly, a color mask interposed in a light path which includes the target area of said tube, a first rigid member of said mask having a plurality of color filter striae arranged in consistent succession, a second flexible member at least co-extensive with said first member and having alternate opaque and light-transmitting striae, a third rigid light-transmitting member fixedly positioned relative to said first member and approximately co-extensive therewith, means to maintain a constant angular relation between striae on said first member and said second member, and driving means to cause movement of said second member in the space between said first member and said third member for bringing the color filter striae of said first member successively in register with the light-transmitting striae of said second-named member, the spacing between said flexible member and said rigid members being such as to provide frictionless captivation of said flexible member by said rigid members over at least the major portion of its area.

2. Apparatus as in claim 1 wherein said scanning means has a repetitive component, means for time-dividing said component by an integer equivalent to the number of primary colors represented in the color filter striae of first-named member, wherein a first delay is inherent in said driving means, and a delay means introducing a second delay interposed between said time-dividing means and said driving means to produce a sum of said first delay and said second delay substantially equivalent to one repetition of said repetitive component.

3. Apparatus as in claim 1 further including sensing means for sensing the motion of said second-named member, and feedback means interposed between said sensing means and said driving means.

4. Apparatus as in claim 1 including semi-elastic stop means for modifying the motion of said second-named member.

5. Color television display apparatus comprising a cathode-ray tube having a target area, scanning means associated with said tube to scan said target area successively and cyclicly, a color mask interposed in a light path which includes the target area of said tube, said color mask including a first rigid member having a plurality of color filter striae and substantially neutral striae arranged in consistent succession, a second flexible member at least co-extensive with said first member and having alternate opaque and light-transmitting striae, a third rigid light-transmitting member fixedly positioned relative to said first member, means to maintain a constant angular relation between striae on said first member and said second member, means to cause movement of said second member, means to cause movement of said second member in the space between said first member and said third member for bringing the color filter striae of said first member successively in register with the light-transmitting stria of said second-named member, and controllable means to terminate said movement and place said neutral striae continuously on said first-named member in registration with said light-transmitting striae on said second-named member.

6. A system for converting a monochrome television display to a color television display, wherein said monochrome display is generated by means including a cathode ray tube having a target area, said means including scanning devices for scanning said target area successively and cyclically in vertically developed frames, the combination comprising a color mask, said color mask including a first rigid member having a plurality of generally vertical color filter striae arranged in consistent succession, a second member at least co-extensive with said first member and having alternate opaque and light-transmitting striae, a third rigid light-transmitting member fixedly positioned relative to said first member and engaging the second member to support the latter in operating condition to the first member, means to maintain a constant angular relation between the striae of said first member and the striae of said second member, and mechanical means to effect movement of said second member in the space between said first and third members in such manner as to bring the color striae of said first member successively into register with the light transmitting striae of said second member, said angular relation being selected to synchronize movement of said striae with scanning of said target area.

7. In a system for converting a sequence of monochrome images to a sequence of colored images, a color conversion mask placed between said monochrome images and the eye of an observer, said color conversion mask including a pair of spaced parallel rigid stationary light transmissive plates and a flexible movable plate coplanarly interposed between said rigid plates and approximately co-extensive with said rigid plates, the spacing between said rigid plates being arranged and adapted to enable substantially friction free motion of said flexible movable plate between said rigid plates while said flexible movable plate is substantially planarly captivated between said rigid plates over at least the major part of its area.

8. The combination according to claim 7 wherein one of said movable plates and one of said rigid plates include registering transparent striae and identical sets of further striae, the respective striae all extending at least approximately parallel to each other and the widths of all said striae taken perpendicular to the direction of parallelism being approximately equal, said sets of further striae each including sequential colored striae having colors selected to synthesize a color on relative periodic scanning of said transparent striae and said colored striae in a direction perpendicular to the direction of said parallelism and over an extent approximately equal to the width of one set of sequential colored striae.

9. The combination according to claim 8 wherein one stria of each of said identical sets of striae is transparent, whereby alignment of the transparent striae of said sets with said first mentioned striae converts said monochrome images to further monochrome images.

10. The combination according to claim 9 wherein is provided means including a solenoid for pushing said flexible plate in a first sense in response to an energizing signal and spring means for returning said solenoid in a sense opposite to said first sense, means securing said solenoid to substantially one point only of said flexible screen adjacent one edge of said flexible screen, said solenoid being the sole actuating motor for said flexible plate, and semi-flexible stop means for terminating the return motion of said solenoid.

11. The combination accordingly to claim 10 wherein said monochrome images are successively generated television images formed by successively vertically displaced horizontal scans and wherein said motion of said flexible plate is horizontal and the orientations of said striae are vertical, and wherein is provided means for synchronizing the scanning rate of said striae with the rate of generation of said television images.

12. The combination according to claim 7, where in said flexible moveable plate is a sheet of flexible plastic having a thickness of no greater than .010″.

13. The combination according to claim 7 wherein one of said stationary plates includes plural parallel color striae arranged in repetitive succession.

14. The combination according to claim 7 wherein one of said stationary plates includes plural identical groups of striae located in adjacent succession, only one of the striae of each group being optically neutral and the remainder of the straie of each group being transmissive of distinct colors, and the movable plate includes one clear stria per group of striae of said one of said stationary plates.

15. The combination according to claim 7 wherein said distinct colors are green, red and blue.

16. The combination according to claim 7 wherein is provided means for supporting said flexible moveable plate at only two points thereof.

17. The combination according to claim 16 wherein is provided means for adjusting the tilt of said flexible movable plate in its own plane and thereby with respect to said monochrome images.

18. The combination according to claim 14 wherein is provided means for vibrating said flexible movable plate transversely of said monochrome images sufficiently to superpose said clear stria in succession over said color striae without exposing said optically neutral stria.

19. The combination according to claim 18 wherein is further provided means inclusive of said means for vibrating for locking said flexible movable plate so that said optically neutral stria is always superposed on said one clear stria.

20. In a selectively color and black and white display apparatus for employment in conjunction with a black and white television display apparatus, means responsive to color television signals to convert a black and white display selectively to a black and white display and to a color display, said means including a color mask, said color mask including a first striated plate and a second striated plate, said first striated plate including groups of striae, each group including colored striae and one neutral stria, said second striated plate including alternate opaque and transparent striae, a motor circuit including a solenoid motor electrical circuitry, means coupling said solenoid in driving relation to one of said plates for oscillatory movement relative to the other of said plates, means delivering to said solenoid a substantially sawtooth current to effect a substantially linear relatively slow scan of said one of said plates from a starting position, spring means for returning said one of said plates to said starting position relatively rapidly, means for adjusting said scan to constrain scan of said colored striae only by said transparent striae, and means for electrically adjusting said electrical circuitry to maintain said solenoid so energized but said neutral striae and said transparent striae are continuously in registration.

References Cited by the Examiner

UNITED STATES PATENTS

| | | | |
|---|---|---|---|
| 2,457,415 | 12/1948 | Szklai | 178—5.4 |
| 2,602,854 | 7/1952 | Bedford | 178—5.4 |
| 2,674,649 | 4/1954 | Wetzel | 178—5.4 |
| 2,713,083 | 7/1955 | Tomer | 178—5.4 |
| 2,721,893 | 10/1955 | Vanderhooft | 178—5.2 |
| 2,954,424 | 9/1960 | Tkeile | 178—5.4 |
| 3,109,885 | 11/1963 | Soghoian | 178—5.4 |

ROBERT L. GRIFFIN, *Primary Examiner.*

J. A. O'BRIEN, *Assistant Examiner.*